United States Patent [19]

Rubin

[11] Patent Number: 5,013,569
[45] Date of Patent: May 7, 1991

[54] INFANT FORMULA

[75] Inventor: David Rubin, San Diego, Calif.

[73] Assignee: Century Laboratories, Inc., Port Washington, N.Y.

[21] Appl. No.: 526,096

[22] Filed: May 21, 1990

[51] Int. Cl.$^5$ ............................................. A23C 9/20
[52] U.S. Cl. .................................. 426/585; 426/801
[58] Field of Search .................... 426/801, 585, 580

[56] References Cited

U.S. PATENT DOCUMENTS

| | | | |
|---|---|---|---|
| 3,542,560 | 11/1970 | Tomarelli | 426/585 |
| 3,558,323 | 1/1971 | Cannalonga | 426/98 |
| 3,649,295 | 3/1972 | Bernhart | 426/598 |
| 4,112,123 | 9/1978 | Roberts | 426/801 |
| 4,670,285 | 6/1987 | Clandinin | 426/585 |

FOREIGN PATENT DOCUMENTS

| | | | |
|---|---|---|---|
| 3512705 | 9/1986 | Fed. Rep. of Germany | 426/585 |
| 3603000 | 8/1987 | Fed. Rep. of Germany | 426/801 |
| 64-80250 | 3/1989 | Japan | 426/801 |
| 1-196255 | 8/1989 | Japan | 426/585 |

OTHER PUBLICATIONS

21 CFR 105 Foods for Special Dietary Use.

*Primary Examiner*—Carolyn Paden
*Attorney, Agent, or Firm*—Browdy and Neimark

[57] ABSTRACT

An infant food formulation substantially approximating human milk in fatty acid composition comprising a mixture of DHA and EPA in a ratio of approximately 3:2 by weight, immunoglobulins to mimic the immunoglobulin content of mother's milk, a source of protein, a source of carbohydrate, a source of ash, and sufficient water to provide an easily assimilable infant formula, the DHA, the EPA, and the immunoglobulins being encapsulated in capsules having a diameter of less than 350μ.

6 Claims, No Drawings

INFANT FORMULA

FIELD OF THE INVENTION

The present invention is directed to ready-to-feed and powdered infant formulas that can be used for pre-term and full-term infants.

BACKGROUND OF THE INVENTION

In the past, ready-to-feed infant formulas have been prepared by the appropriate blending of ingredients, including varying proportions of selected animal fats to yield a composition having a protein, mineral, carbohydrate, and fatty acid composition approximating that of human milk fat. However, the fatty acids of such artificial formulations have not been as well absorbed by the infant, or by experimental animals, e.g., the laboratory rat, as are the natural fatty acids in milk.

Canadian patent No. 927,187 discloses a dietary product intended to adapt cow's milk to the requirements of human infants, and to make the cow's milk similar to human milk. The lipid component of this dietary product is preferably a mixture of vegetable oils with soy lecithin and eventually with milk fats.

Canadian Patent No. 927,188 discloses an edible fat composition intended to resemble that of human milk fat. This composition includes various proportions of oleic oil; oleo oil; a seed oil comprising at least one or more of soybean oil, corn oil, peanut oil, sunflower seed oil, and cottonseed oil; coconut oil and/or babassu oil; and soy lecithin.

The dietary products and fatty acid compositions disclosed in these patents rely upon edible oils, soy lecithin, and/or milk fats to form the lipid component. However, these oils do not contain the $C_{20}$ and $C_{22}$ omega-6 and omega-3 fatty acids which are present in human milk. Accordingly, these preparations do not provide a balance of fatty acids that are similar in composition to that of human milk.

It is known that the composition of dietary fat is a major determinant of tissue composition during the formative stage in the growth and development of an organ. An analysis of human milk at day 16 of lactation was used to estimate infants' daily intake of $C_{20}$ and $C_{22}$ omega-3 and omega-6 fatty acids. The study indicated that significant amounts of these fatty acids are normally received by the infant fed human milk.

Past studies have not resolved the nutritional biochemical question of how much and which essential fatty acids should be provided in a dietary formula to premature infants to ensure normal synthesis of nerve tissues. Such tissues would normally contain high levels of long-chain metabolites of essential fatty acids as basic structural material. In particular, it is important that the quantities of the $C_{20}$ and $C_{22}$, omega-3 and omega-6 fatty acids be limited to appropriate ranges in a dietary formula. Insufficient supply of these fatty acids would interfere with brain development. Over-feeding of these fatty acid could distort normal prostaglandin metabolism and thus have adverse effects on the infant's physiology. For example, providing too much of these fatty acids could result in over-production of prostaglandins in the gut, which could lead to a hyperactive gut and diarrhea.

Studies on the composition of human milk have identified further substances not found in many cow's milk-based formulas. Recently, it has been shown that human milk contains physiologically active concentrations of prostaglandins, specifically prostaglandin $E_2$, prostaglandin $F_{2\alpha}$, and the metabolites of prostaglandin $I_2$, namely 6-keto-prostaglandin $F_{1\alpha}$. These prostaglandins and their metabolites are present in human milk at all stages of lactation and change in concentration during lactation in a manner analogous to the development of the infant's capacity to absorb nutrients. For example, in approximately the first three weeks of infant life, the level of these prostaglandins and their metabolites increases in human milk, as does the infant's capacity to absorb nutrients.

It is known that prostaglandins affect functions related to nutrient absorption. Thus, in the human a variety of physiological functions are affected in the gut by prostaglandins, e.g., gastric acid and mucous secretion, smooth muscle contraction, local circulation, nutrient transport, and absorption.

However, providing the optimum ratio of the omega-3 and omega-6 $C_{20}$ and $C_{22}$ fatty acids in an infant formula is essential in order to provide early nutrition. For a growing infant, DHA is more important that EPA. For example, DHA is required for growth of the retina, and 70% of the lipid sheath of nerves is composed of DHA. DHA is also required for brain and nerve development. Therefore, it is important that an infant formula provide sufficient DHA to the infant. Naturally occurring sources, such as fish oil, are generally used as a source of EPA and DHA for infant formula. For example, in U.S. Pat. No. 4,670,285, Clandinin et al. disclose an edible fat formula for feeding infants wherein the omega- and omega-6 fatty acids are derived from fish oil. Unfortunately, the ratio of EPA to DHA in fish oil is the reverse of what is required by a growing infant, and an insufficient amount of DHA is present in the formula.

A number of other infant formulas have been commercialized in an attempt to duplicate the nutritional value of mother's milk. However, to date, none of these formulas has proven completely acceptable in terms of infant nutrition, particularly for premature infants.

Tomarelli et al., in U.S. Pat. No. 3,542,560, disclose an infant formula having a fat similar to the fat in human milk, including palmitic acid.

Cannalonga et al., in U.S. Pat. No. 3,558,323, disclose a vitamin-containing composition in beadlet form, the vitamins being generally fat-soluble vitamins, which can then be incorporated in milk. When these beadlets are dispered in milk, they impart no off-flavor to the milk, and the beadlets can be mixed with spray-dried skim milk powder without affecting the stability of the powder.

Roberts, in U.S. Pat. No. 4,112,123, discloses a nutritionally balanced food composition for patients having abnormal catabolic states. These compositions include protein obtained from the ultra-filtration of sweet or acid wheys and contain $\beta$-lactoglobulin, $\alpha$-lactalbumin, immunoglobulins, and serum albumin. This food made be prepared in dried powder form to be reconstituted with a liquid. The powder may include encapsulated and embedded minerals.

Durst, in U.S. Pat. No. 4,800,087, discloses pharmaceutical compositions comprising a pharmaceutical core comprising a pharmaceutically active dose of a compound and a microencapsulating polymer which coats the pharmaceutical core and is capable of masking the taste of the active compound. The polymer coating does not fracture or release active ingredients when tabletted and/or chewed. These capsules may be included in a liquid formulation, although infant formula is not disclosed.

SUMMARY OF THE INVENTION

It is an object of the present invention to overcome the aforementioned deficiencies in the prior art.

It is another object of the present invention to provide a mixture of fatty acids for incorporation into an infant formula.

It is yet another object of the present invention to provide an infant formula for optimum growth.

According to the present invention, a fat composition is provided for use in infant formula comprising (all-Z)-4,7,10,13,16,19-docosahexaenoic acid, hereinafter referred to as DHA and (all-Z)-5,8,11,14,17-eicosapentaenoic acid, hereinafter referred to as EPA in an approximate ratio of from about 1:1 to about 2:1, and preferably about 3:2 by weight. These fatty acids are preferably in the form of free acids rather than as the naturally occurring triglycerides. The EPA and DHA can also be in the form of their pharmaceutically acceptable salts, esters, or amides. Additionally, these acids may be in their natural state as they are extracted from natural sources such as marine animals, daphnae, algae, and the like, although the weight ratios of the acids are different from that in the naturally occurring state. Lower esters and amides which can be converted in vivo to the acid and other pharmaceutically acceptable products may be used, the preferred ester being the ethyl ester. The preferred salts are the sodium, potassium, calcium, or magnesium salts, as well as any other pharmaceutically acceptable solid salts. Among the methods that can be used for obtaining EPA and DHA from these sources are those shown in Rubin et al., U.S. Pat. No. 4,792,418, which patent is hereby incorporated by reference.

According to another aspect of the present invention, an infant formula is provided which contains optimum amounts of DHA and EPA in a ratio of approximately 1:1 to about 2:1, and preferably about 3:2, by weight. The infant formula of the present invention also preferably includes immunoglobulins which are substantially identical to the immunoglobulins found in human milk. These immunoglobulins are included in the infant formula in the form of microcapsules which are stable to the processing conditions of the formula and are not detectable by the infant.

The infant formula of the present invention preferably contains from about 0.1 to about 5.0% by weight of the mixture of DHA and EPA which is a quantity substantially to mimic the relative quantity of fatty acid in human mother's milk. The DHA and EPA can be from synthetic sources, or can be obtained from natural sources in hydrolyzed form. As noted supra, the ratio of DHA to EPA in the present infant formula is different from the ratio found in naturally occurring sources. The DHA and EPA are preferably encapsulated in microcapsules having a diameter of less than 350 μ, so that they are not perceptible to the infant and so that they pass easily through the hole of the nipple used for feeding the infant.

DETAILED DESCRIPTION OF PREFERRED EMBODIMENTS

The mixture of DHA and EPA in a ratio of approximately 3:2 by weight can be incorporated into an infant formula in conconcentrated powder or liquid form, or in ready-to-use form.

The infant formula according to the present invention comprises a mixture of DHA and EPA in a ratio of approximately 3:2 by weight, a source of carbohydrate such as sucrose or dextrose, non-fat milk, water, and optional other edible fats. The optional edible fats may be any food-grade fat including, but not limited to, coconut oil, oleo oil, peanut oil, butterfat, soybean oil, olive oil, babassu oil, mutton tallow, and the like. Among the fatty acids that are provided by these fats are lauric acid, myristic acid, palmitic acid, stearic acid, oleic acid, and linoleic acid.

A typical ready-to-feed formulation for infants comprises, when diluted to feeding concentrations, from about 1-5% by weight fat, from about 0.01 to about 0.5% by weight immunoglobulins as appropriate, from about 4-10% by weight carbohydrate in a quantity substantially to mimic the carbohydrate content of human mother's milk, from about 0.5 to 4% by weight protein in a quantity substantially to mimic the protein content of human mother's milk, optional vitamins and minerals as required, a total solids content of from about 8 to 17% by weight, and the remainder water.

A typical protein source for use in infant formula is electrodialyzed whey or electrodialyzed skim milk or milk whey, although other protein sources are also available and may be used. Sugars include food grade substances such as glucose, dextrose, sucrose, or edible lactose. The following vitamins and minerals may also be incorporated in the infant formula: calcium, phosphorus, potassium, sodium, chloride, magnesium, manganese, iron, copper, zinc, selenium, iodine, and vitamins A, E, D, and B complex. These micronutrients are added in the form of commonly accepted nutritional compounds in amounts equivalent to those present in human milk on a per calories basis.

To prepare an infant formula according to the present invention, the fat soluble vitamins are dissolved in the mixture of fatty acids, and the remaining formula ingredients are dissolved in the water. The fat mixture with the dissolved vitamins and the water solution are then mixed and homogenized. Adequate amounts of other trace minerals are present in the electrodialyzed whey and non-fat milk.

The infant formula according to the present invention is sterilized and subsequently used on a ready-to-feed basis, or can be stored as a concentrate. The concentrate can be prepared by spray drying the formula prepared as above, and the formula can be reconstituted by rehydrating the concentrate. The infant formula is a stable liquid and has a suitable shelf life.

Preferably, both the fatty acids and the immunoglobulins are encapsulated in microcapsules. The choice of coating for the microencapsulation of the DHA and EPA and/or the globulin is determined by its lack of toxicity, desired particle size, and stability under the processing conditions for infant formulas, particularly sterilization. Any conventionally acceptable substantially oxygen-impermeable coating for pharmaceuticals can be used in the present invention. Examples of these coating compositions and methods for microencapsulation are given in U.S. Pat. No. 4,001,140 to Foris et al., which patent is hereby incorporated by reference. Other conventional microencapsulating methods and coating materials are well within the purview of one skilled in the art, and the specific microencapsulating method and coating are not peculiar to the present invention.

A particularly successful method for encapsulating the EPA and DHA and the globulins is by forming micelles in a water-in-oil emulsion, using a polymerizable surfactant such as acrylamide. The surfactant is polymerized in various ways, as by x-ray or gamma radiation. The particle sizes range from about 80 to about 300 nm. These particles are sufficiently small that the infant does not perceive their presence in the liquid formula, and there is no possibility of the capsules' interfering with liquid flow through the nipple.

Other methods of preparing microcapsules for use in the present invention include spray drying wherein the DHA and EPA are emulsified into a solution of a polymer, such as gum arabic, and spray-dried to make fine particles. Particles of 250 μm are ideal for inclusion in the infant formulas according to the present invention. When the EPA and DHA or the globulins are incorporated into a meltable fat or wax, the process is called spray-chilling, since the emulsion need only be chilled below its melting point to form particles.

Another encapsulation process that can be used to encapsulate the DHA and EPA as well as the globulins is by suspending the EPA and DHA in a solution of the wall material. The wall polymer is then induced to separate as a liquid phase. By adding a nonsolvent for the polymer, decreasing the temperature, or by adding a phase inducer, another polymer that has higher solubility in the solvent. In the latter case, incompatibility between the two polymers causes the first polymer to separate as another phase. When the wall polymer separates as a polymer-rich liquid, this phase is called a coacervate and the process is called coacervation. As the coacervate forms, it must wet the suspended core particle and coalesce into a continuous coating. The final step is the hardening and isolation go the microcapsules.

Gelatin and gum arabic also for a pharmaceutically acceptable coating for the EPA and DHA and globulins for use in the present invention. In this process, gelatin having a high isoelectric point and gum arabic, which contains mainly carboxyl groups, are added to a core-containing suspension at pH 2–5 at a temperature above 35° C. to ensure that the coacervate is in the liquid phase. As the gelatin and gum arabic react, viscous liquid microdroplets of polymer-coacervate separate. This wall can be hardened by several means, including addition of formaldehyde. Finally, the mixture is cooled to 10° C., the pH is adjusted to about 9, and the microcapsule suspension is filtered.

In another coacervation process, two gelatins of differing isoelectric points are used as the reacting species. In this case, the coacervation is reversible before hardening, and any distorted capsules can be heated to restore their spherical shape. These microcapsules are hardened by the addition of glutaraldehyde.

Another technique for encapsulating the DHA an EPA and globulins for use in the present invention is based upon polymer-polymer incompatibility. A coacervate of the wall material is induced to form from solution by the presence or addition of a phase-inducer. The general phenomenon of polymer-polymer incompatibility is based on the fact that the free energy of mixing for polymers is positive owing to a positive entropy change and negligible entropy change.

Another method for microencapsulating the DHA and EPA and globulins for use in the present invention involves adding a nonsolvent for the wall polymers.

Another method for forming microcapsules of the EPA and DHA and globulins is based upon the observations that some cellulosic polymers are soluble in cold water but not in hot water, such as hydroxypyropyl cellulose and ethyl hydroxyethyl cellulose. These materials precipitate from solution when the temperature exceeds a critical value of about 40°–70° C. To carry out microencapsulation of the compounds based upon this phenomenon, the compound to be encapsulated is dispersed in an aqueous solution of the cellulosic material at at a low temperature where it is still soluble, in the presence of a surfactant. The dispersion is then heated until the cellulosic polymer gels or precipitates form solution, wetting the oil droplets. While the dispersion is hot, the cellulosic wall is solidified by reaction with a water-soluble agent such as dimethylolurea, urea-formaldehyde resin, or methoxymethylmelamine resin. Because this is typically a slow reaction, resulting in somewhat porous walls, a cross-liking agent is added before dispersion so as to produce microcapsules with tight walls.

Microcapsules for use in the present invention can also be prepared by interfacial polymerization. In interfacial polymerization, the two reactants in a polycondensation meet at an interface and react rapidly. The coatings may be polyesters, polyurea, polyurethane, or polycarbonates.

Another manner of microcapsule formation is based upon the fact that alginic acid anion forms an insoluble precipitate instantly upon contact with calcium ions. Hence, if droplets of an aqueous solution of sodium alginate are placed into a calcium chloride solution, a membrane quickly forms around the droplets. If the initial droplets contain enough alginate and are allowed to remain in the calcium-containing solution long enough, they gel completely.

Thus, any conventional microencapsulation technique can be used with an substantially oxygen-impermeable and heat-resistant coating material to form the microcapsules for use in the present invention.

Of course, since the microcapsules formed are to be used in an infant formula, only wall material approved by the FDA should be used. The GRAS list provides a listing of compounds that can be used for forming the capsule walls. Some materials, such as starches, cellulosic compounds, and gums, have been used for may years as food additives or as excipients in drug formulation.

Alternatively, the capsules can be formed by incorporating the EPA and DHA into an inclusion compound with a suitable host compound. The inclusion compound, which is in the form of a relatively free-flowable powder, is then microencapsulated with a substantially oxygen-impermeable coating material to form a protective microcapsule. The inclusion compound can be amyloses or cycloamyloses such as the cyclodextrins.

Typical ready-to-feed infant formulas contain the following ingredients, where the fat ingredient is a mixture of DHA and EPA in a ratio of approximately 3:2. These fats are in the form of the free fatty acids, and are encapsulated in microcapsules. The encapsulation of the free fatty acids prevents them from being oxidized by exposure to ambient air, and masks any unpleasant taste or odor they may impart to the formula. The immunoglobulins used are also encapsulated in microcapsules to preserve their activity.

Typical ready-to-feed formulations include the following ingredients, the fats being DHA and EPA in an approximately 3:2 weight ratio:

|  | Concentrated Liquid w/v | Powder w/w | Diluted Liquid w/v |
| --- | --- | --- | --- |
| Fat | 2–10 | 8–40 | 1–5 |
| Carbohydrate | 8–20 | 32–80 | 4–10 |
| Protein | 1.8–6.6 | 8–28 | 0.9–3.4 |
| Immunoglobulins | 0.02–0.6 | 0.08–1 | 0.001–0.3 |
| Total Solids | 12–36 | 25–100 | 6–18 |
| Water | 88–64 | 0–5 | 93–82 |

The concentrated liquid and powder are easily reconstituted by adding sufficient water to make the desired concentration. The liquid and powder forms are shelf-stable in cans, as is the diluted formula. The microencapsulation of the fatty acids and of the immunoglobulins renders them stable upon exposure to the high temperatures and/or pressures used to sterilize the formula for packing.

The infant formulas of the present invention are particularly designed for feeding to premature infants. However, they are also suitable for feeding to full-term infants as well.

The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

What I claim is:

1. An infant food formulation substantially approximating human milk in fatty acid composition, comprising:

a mixture of 4,7,10,13,16,19-docosahexaenoic acid (DHA) and 5,8,11,14,17-eicosapentaenoic acid (EPA) in a ratio of approximately from 1:1 to 2:1 by weight, the EPA and DHA being present in a quantity substantially to mimic the relative quantity of fatty acid in human mother's milk;

immunoglobulins in a quantity substantially to mimic the immunoglobulin content of human mother's milk;

a source of protein in a quantity substantially to mimic the protein content of human mother's milk;

a source of carbohydrate in a quantity substantially to mimic the carbohydrate content of human mother's milk;

and sufficient water to provide an easily assimilable infant formula, said DHA and EPA and said immunoglobulins being microencapsulated.

2. The infant formula according to claim 1 wherein the DHA and EPA are in a ratio of approximately 3:2 by weight.

3. The infant formula according to claim 1 wherein the EPA and DHA are in the free acids form thereof or in the form of a pharmaceutically acceptable salt thereof.

4. The infant formula according to claim 1 comprising from about 1–5% by weight of fat, from about 0.01 to about 3.0% by weight immunoglobulins, from about 4–10% by weight carbohydrate, from about 0.5 to 4% by weight protein, from about 0.1 to 1% by weight ash, a total solids content of about 8–17% by weight, and the remainder water.

5. The infant formula according to claim 4 comprising from about 1–5% by weight of fat, from about 0.01 to about 3.0% by weight immunoglobulins, from about 4–10% by weight carbohydrate, from about 0.5 to 4% by weight protein, a total solids content of about 8–17% by weight, and the remainder water.

6. A concentrate for preparing an infant food formulation substantially approximating human milk in fatty acid composition, comprising:

a mixture of DHA and EPA in a ratio of approximately from 1:1 to 2:1 by weight, the EPA and DHA being present in a quantity substantially mimicing the relative quantity of fatty acid in human mother's milk;

immunoglobulins in a quantity substantially to mimic immunoglobulin content of human mother's milk; and a source of protein in a quantity substantially to mimic the protein content of human mother's milk.

* * * * *